Figure 1:
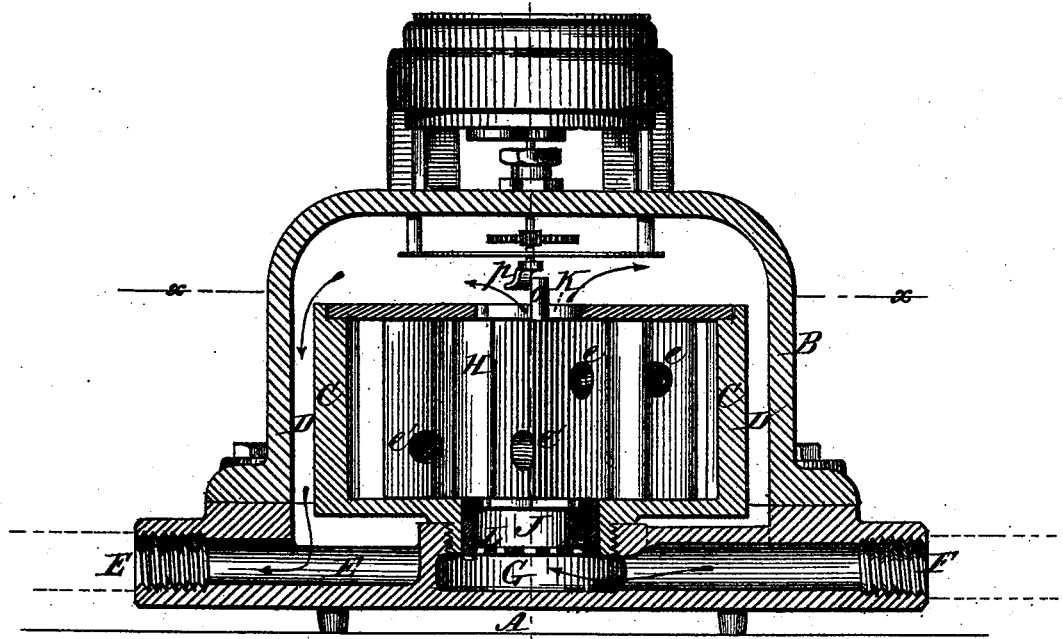

5 Sheets—Sheet 1.

L. H. NASH.
Rotary Water-Meter.

No. 211,582. Patented Jan. 21, 1879.

Attest:
H. L. Perrine
Floyd Norris

Lewis H. Nash
Inventor.

By Johnson and Johnson
Atty's

L. H. NASH.
Rotary Water-Meter.
No. 211,582. Patented Jan. 21, 1879.
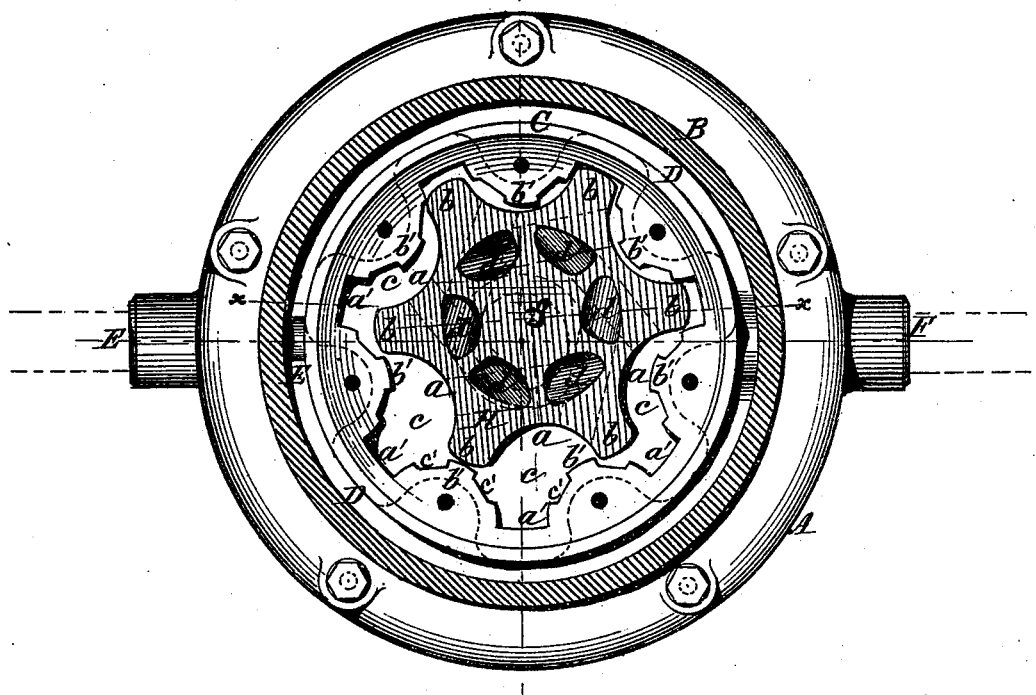
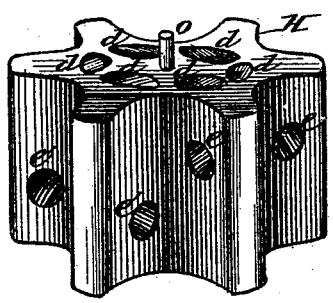
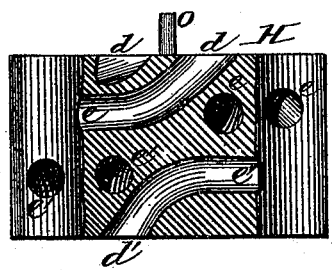
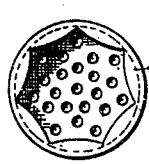
Attest:
H. L. Perrine
Floyd Norris
Lewis H. Nash
Inventor.
By Johnson & Johnson
Atty's

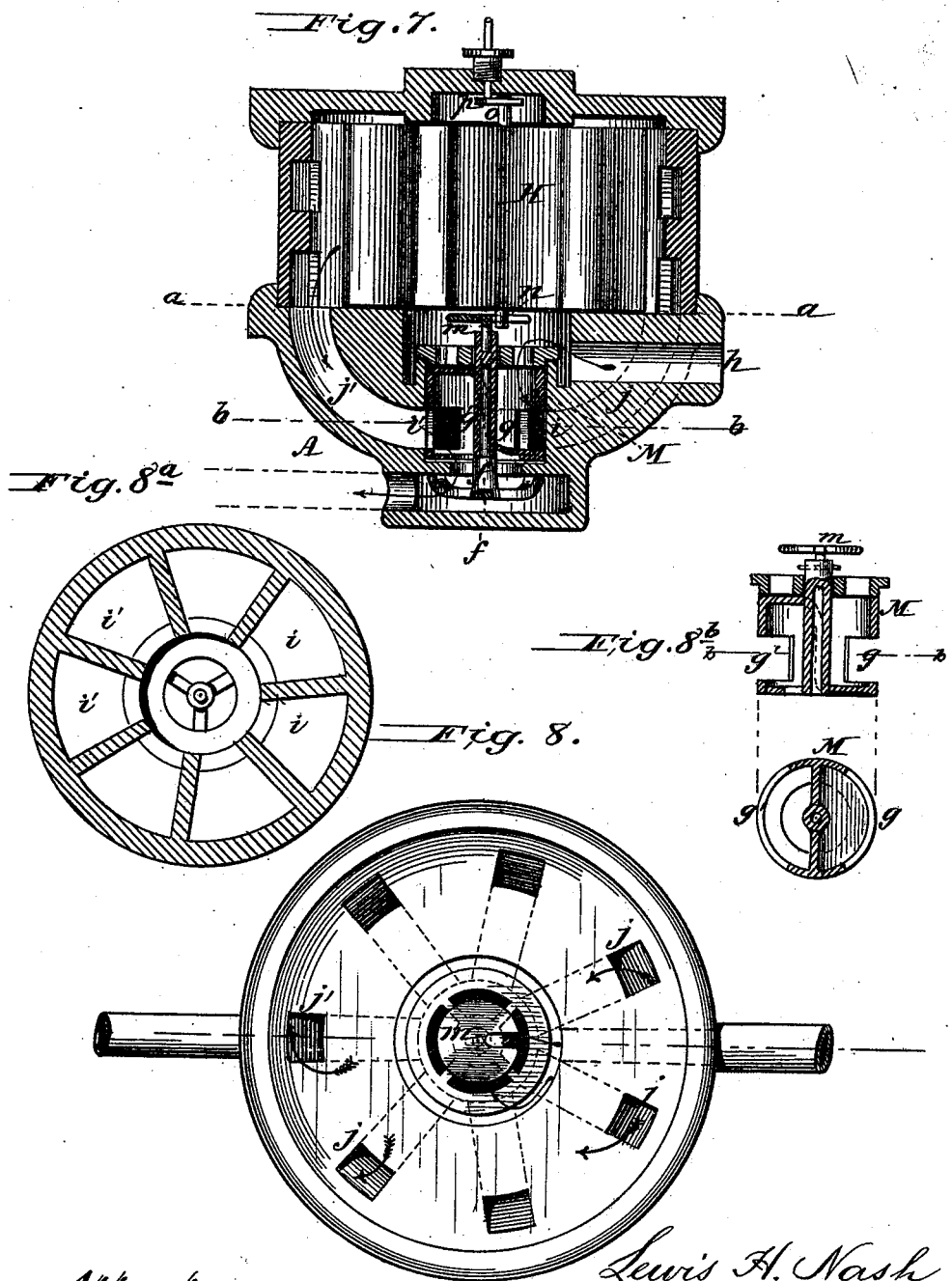

L. H. NASH.
Rotary Water-Meter.

No. 211,582.   Patented Jan. 21, 1879.

Attest:
H. L. Perrine
Floyd Norris

Leon H. Nash
Inventor.
By Johnson & Johnson
Atty's

5 Sheets—Sheet 5.

L. H. NASH.
Rotary Water-Meter.

No. 211,582. Patented Jan. 21, 1879.

Attest:
H. L. Perrine.
Floyd Norris.

Lewis H. Nash,
Inventor.
By Johnson & Johnson,
Atty's

UNITED STATES PATENT OFFICE.

LEWIS H. NASH, OF BROOKLYN, ASSIGNOR TO NATIONAL METER COMPANY, OF NEW YORK, N. Y.

IMPROVEMENT IN ROTARY WATER-METERS.

Specification forming part of Letters Patent No. 211,582, dated January 21, 1879; application filed September 4, 1878.

*To all whom it may concern:*

Be it known that I, LEWIS H. NASH, late of South Norwalk, Connecticut, but now of Brooklyn, in the county of Kings and State of New York, have invented certain new and useful Improvements in Water-Meters; and I do hereby declare that the following is a full, clear, and exact description thereof, which will enable others skilled in the art to which it appertains to make and use the same, reference being had to the accompanying drawings, and to letters of reference marked thereon, which form a part of this specification.

To obtain accuracy of measurement in a water-meter, with a construction specially adapted for durability of operation, and by which a positive displacement of the water is effected without impeding the flow and interrupting the pressure of the head, is the object of my invention.

Water-meters adapted with reciprocating pistons, while effecting accurate measurement, have the disadvantage of interfering with the flow, and as a consequence entail the loss of pressure in the flow.

In my improved meter I use a piston adapted to have an eccentric or side rocking motion across the center of a cylinder-chamber, to effect its division at two or more points into receiving and discharging spaces. The piston operates with two or more continually-changing points or lines of bearing, or contact with two or more points or contact-bearings of the cylinder at different points at the same time, by which the receiving and discharging spaces of the cylinder are caused to continually change their volume with an unobstructed flow and a positive displacement of the water from the discharging-space of the cylinder by the rocking of the piston from one bearing-point to another across the chamber of the cylinder. With this eccentric or side-rocking action the piston also revolves around its own center, and both these movements are effected by the relative shape of the piston and cylinder, and by the direct action of the water upon the piston, for, as the piston rocks from one bearing-point to another directly across the center of the cylinder, it is at the same time revolved to effect the measurement of the water passing into and from the cylinder-spaces; and to accommodate this eccentric or side-rocking motion of the piston, it must have a free or shifting connection with the crank or mover of the registering mechanism.

The continually-changing points or lines of bearing of the piston and cylinder are formed by alternate projections and recesses, and the eccentric or side-rocking movement of the piston is governed by the extent of the projecting bearing-points and the depth of the recesses, so that in the rotation of the piston around its own center one or more projecting bearing-points of the piston will pass into corresponding recesses at one point of the cylinder, and in contact with and over one or more projecting bearing-points of the cylinder at a different point, thereby always maintaining a direct contact of the piston and cylinder at two or more dividing-points within the continually-changing cylinder-spaces, and obtain thereby a continuous flow without interfering with the pressure of the head.

The object of these continually-changing points or lines of contact at different parts of the piston and the cylinder, and of the continually-changing volumes of the receiving and discharging spaces formed thereby, is to allow the water to flow through a valve into and from these spaces as they fill and discharge without impeding its flow or lessening its force.

In this connection and for effecting this operation the valve may be formed with and constitute a part of the piston; or it may be separate therefrom and controlled by a connection therewith.

The valve is arranged so that the cylinder-spaces on one side of the piston, as it revolves, have free inlet for the water through one set of the valve-ports, while the spaces on the other side of the piston have free outlets for the water through the other ports of the valve, causing the piston to move with the flow. In this operation the valve opens some and closes others of the ports in succession, in such a manner as to keep the line of pressure of the water as nearly as possible at right angles to the direction of the eccentric or side-rocking and rotary movements of the piston, and thereby avoid any undue lateral pressure of the water upon the piston. This result is accomplished in a more satisfactory manner by increasing the number of the bearing points or lines of the cylinder and piston, as shown in Fig. 3. When the valve is arranged within the piston, it is formed by inlet and outlet openings or ports in the ends of the piston, communicating, by means of passages in or through the cylinder, with the spaces of the cylinder. These end openings or ports communicate with corresponding openings or ports in the ends of the cylinder, which form the inlet and outlet ports thereof.

In the arrangement of the valve separate from the piston, the latter has no inlet and outlet ports; but these are formed within a case communicating with the cylinder, and operate in the same manner with respect to the constantly-changing cylinder-spaces, and the action of such separate valve is the same as one formed within the piston, and its motion is controlled by any suitable free attachment with said piston.

The results of these different arrangements of valves are identical; and any suitable form of valve may be used that will operate with a periodic relation to the movements of the piston, so as to give a uniform flow and a uniform pressure upon the working parts.

Figure 2:
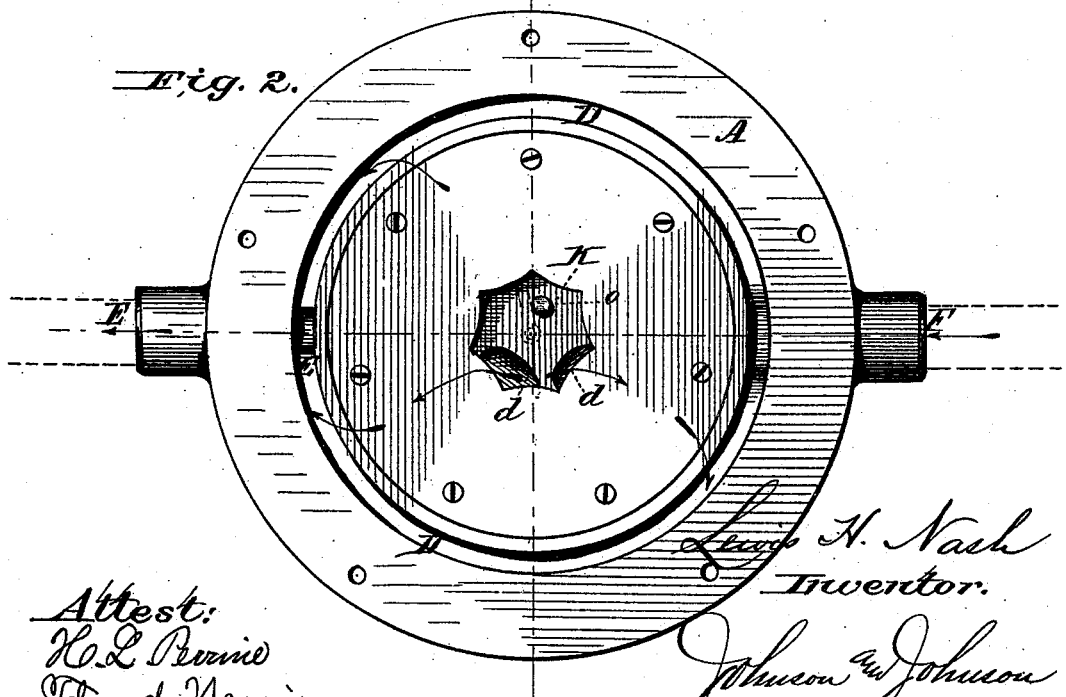
Figure 9:
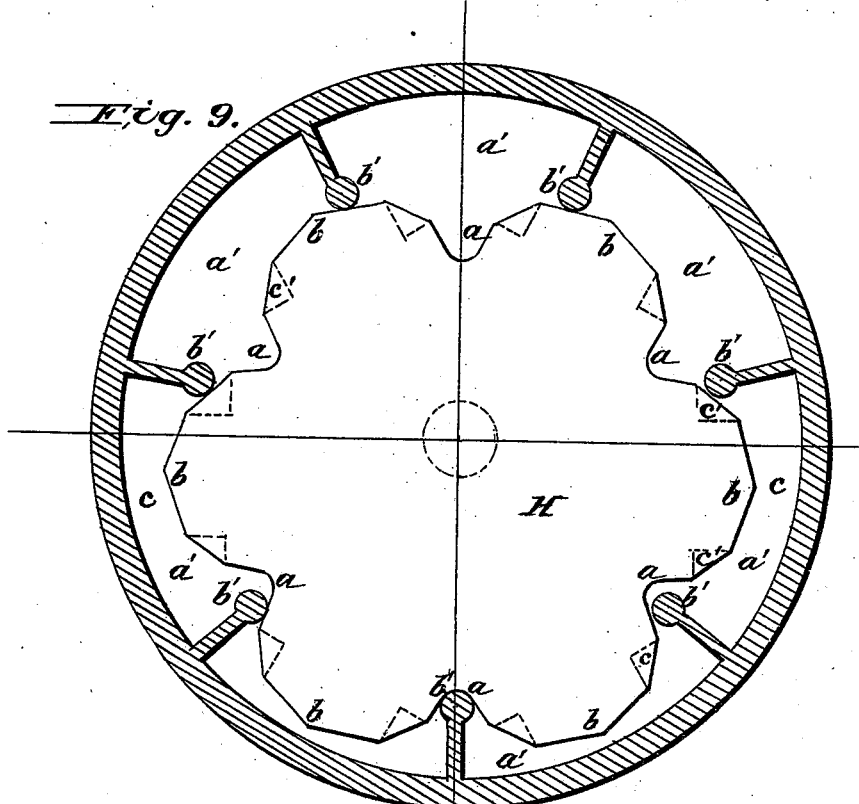
Figure 10:
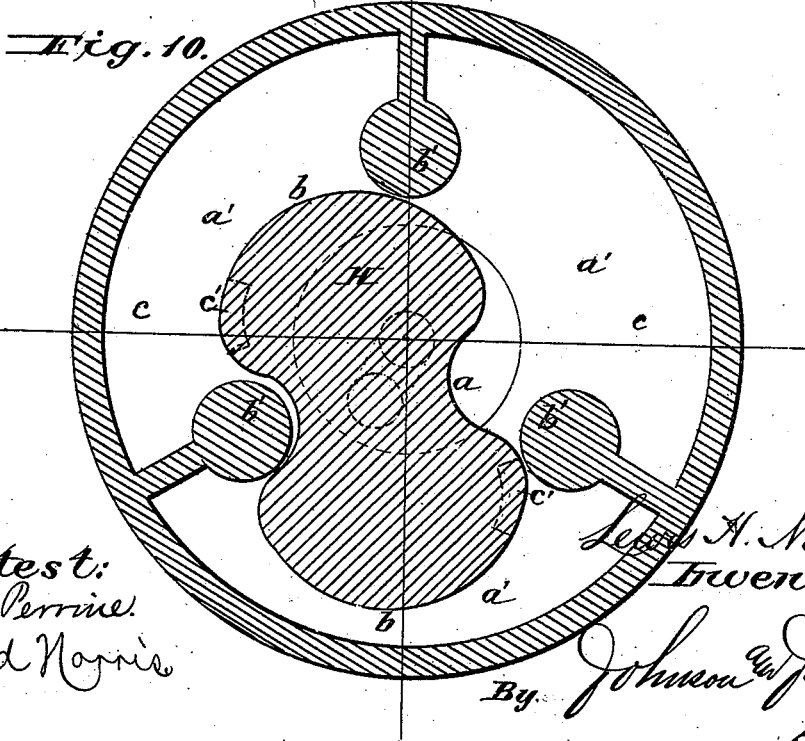
Figure 11:
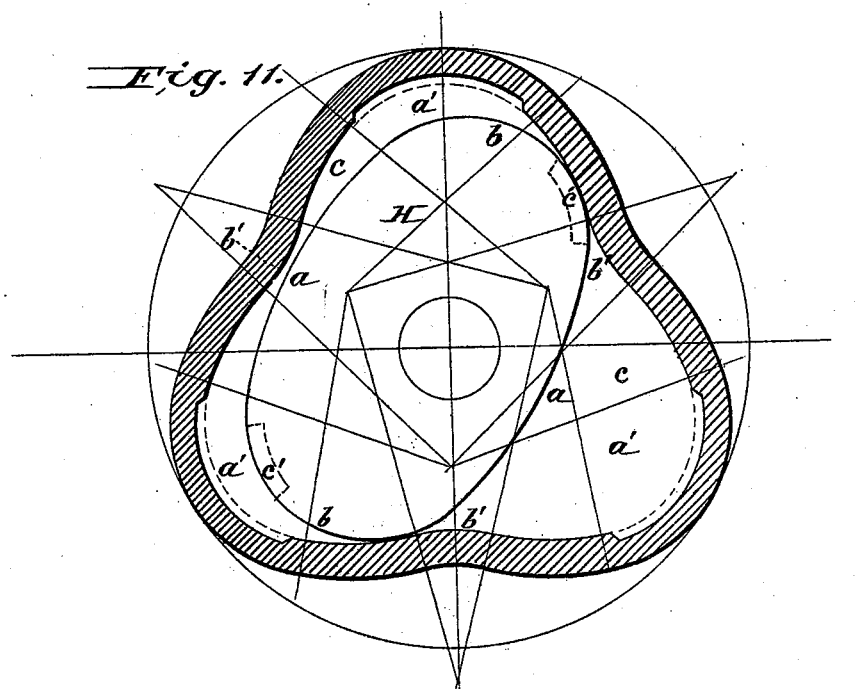
Figure 12:
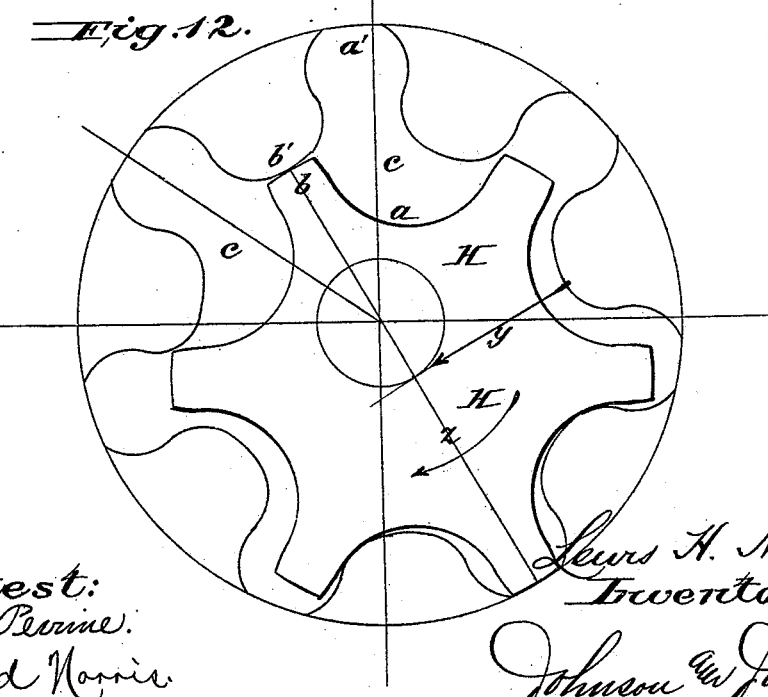

Referring to the drawings, Figure 1 represents a vertical section of a water-meter embracing my invention; Fig. 2, a top view with the case removed, showing one of the cylinder-ports; Fig. 3, a similar view, the cylinder-head being removed, showing one form of the cylinder bearing lines or points in connection with the rotary and side-rocking piston co-operating therewith, and in which the valve is shown as being within the piston, as in Figs. 1 and 2; Fig. 4, the rotary and side-rocking piston with its inclosed valve; Fig. 5, a partial side view of the same, showing the end ports communicating with the lateral passages; Fig. 6, a perforated device at the cylinder-chamber inlet-port, adapted to form a close-wearing joint for the piston; Fig. 7, a vertical section of a modified form of meter, to illustrate the arrangement with the rotary and side-rocking piston of a valve separated therefrom, but controlled by the motions of said piston; Fig. 8, the arrangement of the inlet and outlet passages into and from the cylinder-chamber and a valve separated from the piston, taken on line $a\ a$ of Fig. 7; Fig. 8$^a$, section on line $b\ b$, and Fig. 8$^b$ the separate valve. Figs. 9, 10, and 11 are modified forms of the cylinder bearing points or lines and the corresponding forms of side-rocking and rotary pistons adapted for co-operation therewith, and Fig. 12 shows the direction of the line of pressure upon the piston in relation to its continually-changing motion and the divided cylinder-spaces.

The case I prefer to make in two parts, one, A, of which forms the head or base, and has the inlet and outlet-passages, which communicate with the cylinder-chamber ports, while the other part, B, forms the inclosing-case and carries the dial mechanism.

The cylinder C is secured to the base in any suitable way, leaving a space, D, between its walls and the case B, which space communicates with the outlet-passage E, while the inlet-passage F communicates with the cylinder-inlet port by an opening or openings, G, in the base.

The case B may or may not be used; but when it is it serves to form the space D surrounding the cylinder, and to relieve the working parts from undue pressure. In Fig. 7 the construction does not require the inclosing-case.

The piston H is arranged for operation within the cylinder, and the bearing or contacting surfaces of these parts are formed by alternate recesses $a\ a'$ and projections $b\ b'$, of such form or configuration as to allow of the rotation of the piston, not only upon its own axis, but around and across the center of the cylinder, and the space within the cylinder must be of such form and sufficiently larger than the piston H to allow it to have this compound motion. The object of this compound motion is to form bearing-points or lines of contact of the piston with the cylinder-walls, on opposite sides thereof, at the same time, as shown in Figs. 3 and 12, whereby to divide the cylinder into receiving and discharging spaces. Of whatever form these alternate recesses and projections, they must be such that while they are in contact upon one side of the cylinder they must also at the same time have a contact at the opposite or a different side of said cylinder, and in this way divide the cylinder into spaces. In this contact it will be observed that upon one side of the cylinder and piston such contact takes place between a recess and projection, or intermediately between these points, while upon the opposite side such contact is made by corresponding projections, as shown in Figs. 3 and 12. Intermediately between these points of bearing and division it is advantageous that the cylinder-spaces $c$ should communicate by the depression $c'$, whereby to prevent the choking of the flow and insure a uniform action of the piston.

The compound motion of the piston and the contacting dividing-points are due to the fact that the piston has one or more less points of projection than the cylinder.

When the valve is formed within the piston, as shown in Figs. 1, 2, 3, 4, and 5, the heads of the cylinder have inlet and outlet ports, J and K, which must have such form as to act in connection with ports in the piston to form a valve. As shown in these figures, the valve is formed within or is a part of the piston, and it consists of ports $d\ d'$ in the ends of the piston, communicating with lateral passages $e\ e'$, which communicate with the spaces $c$ of the cylinder, which form the receiving and discharging divisions.

The ports $d'$ receive the water from the cylinder-port J, and discharge it into the cylinder-spaces $c$ through the lateral passages $e'$, while the ports $d$ discharge the water from the cylinder-spaces through the passages $e$, the water flowing from the valve-ports $d$ through the cylinder-port K, whence it passes into the surrounding space D, and out through the discharge-pipe at E.

With this construction of valve I deem it advisable to use a self-adjusting perforated device, L, as the inlet-port, which is carried and held against the piston by the flow of the water against its perforated end, causing the opposite end to maintain a close joint with said piston to take up the wear.

The function of the valve is to regulate the flow of the water in and out of the spaces of the cylinder in such manner as to produce the compound rotation and cross movement of the piston, and this function can be made operative whether the valve be arranged within the piston, as described, or separate from and connected with it, as shown in Figs. 7 and 8 of the drawings, it being only necessary that the motion of the valve should be controlled by the compound motion of the piston in any arrangement; and I do not wish to confine myself to either of the specific arrangements of the valve shown, or to any specific construction of such valves in relation to the piston, so long as the valve and the piston co-operate to produce the results stated.

The valve shown in Figs. 7 and 8 consists of revolving cylinder M, which, by a partition, divides the inlet from the outlet, and is supported by a fixed stem, $f$, within its seat. The water enters through the top of the valve by the ports $h$, and passes out through a side port, $g$, in said valve into corresponding ports $i$ in the valve-seat, thence through the passages $jj$ into the filling-spaces $c$ of the cylinder, and from the discharging-spaces it passes through the passages $j'j'$ and the ports $i'$ in the valve-seat, through the port $g'$, and escapes through the bottom of the valve into the discharge-pipe.

Any of the various forms of the piston shown may be used with the separate valve by making the number of the inlet and outlet ports of the valve-seat to correspond to the number of the bearing-projections of the cylinder. In the arrangement of the separate valve it is operated by a crank or slotted disk, $m$, and a pin, $n$, Fig. 7, on the piston; or any other suitable connection may be made that will allow of the side movement of the piston. The piston is connected to the dial mechanism by a pin, $o$, engaging by a free action with or operating an arm, $p$, of the train of the interior gear, whereby the rotations of the piston are recorded by the usual dial indices.

The recording device is mounted in a separate outside case, and connected with an interior train by means of a shaft through a stuffing-box, as in ordinary dry dial attachments.

It is required, in order to get the best results, that the valve should open and close its inlet and outlet ports in succession in such a manner as to keep the line of pressure as nearly as possible at right angles to the direction of the motion of the piston. By the "line of pressure" I mean a line connecting the points of division which separate the inlet from the outlet spaces $c$ of the cylinder, as shown by the line $z$ in Fig. 12; and by a "line of motion" I mean a line which is tangent to the path of the axis of the piston at any point of such path, as shown by the arrow $y$ in said figure; and in this way these lines continually change their position as the piston rotates and rocks sidewise.

I prefer to make the piston of hard rubber; but it may be made of any suitable material, and either in one piece with the valve, or the latter may be made in the form of a plug and inserted within an opening in the piston.

I have described and prefer in practice that the piston shall have the compound motion described; but it is obvious that the piston may be fixed and the cylinder be made to have the relative compound motion. So in like manner both the cylinder and the piston may have a separate conjoint motion, yet retaining the same relation to each other. In the use of the meter the inlet may become the outlet, and vice versa. It is also contemplated to use the machine as a motor or as a pump, and in the former case the power is taken from the piston through a crank-shaft or otherwise, and in the latter case the power is applied to the piston in the same manner.

The self-adjusting port device L (shown in Figs. 1 and 6) is adjustably seated within and forms said port, and has side walls, with one end perforated and its other end open and provided with a rim, which bears upon the end of the piston, to effect the object stated.

An important feature of my invention embraces the combination, with a piston adapted to operate substantially as described, of a valve controlled thereby irrespective of its specific construction or arrangement.

When an inclosing-case is used in connection with the cylinder they are so arranged in relation to each other as to form an intermediate surrounding space, communicating with the end parts of the cylinder-chamber and with the outlet-port of the receiving end of the piston, for the purpose stated.

It will be seen that the connection of the piston with the registering mechanism is such as to allow of a free or shifting action, to accommodate the side-rocking movements of the piston across the center of the cylinder-chamber and maintain a driving relation with the dial mechanism.

I claim—

1. A piston for water-meters, pumps, and motors having alternate bearing points or projections and recesses, adapted, by means of a cylinder-chamber having alternate bearing points or projections and recesses, to have an eccentric or side-rocking movement within and upon continually-changing lines across the center of said chamber, to effect its division at two or more points on its sides into receiving and discharging spaces $c\ c$, which communicate with the inlet and outlet.

2. The piston of a water-meter, pump, or motor constructed with alternate recesses and bearing points or projections $a$ and $b$, and a cylinder-chamber having alternate wall-recesses and bearing points or projections $a'$ and $b'$, adapted to intermatch with each other at one or more bearing-points at one side of the cylinder and allow the projections of each part to bear upon and to pass each other at two or more points at a different side of the chamber, to allow the piston to revolve while it also rocks in constantly-changing lines across the center of the cylinder-chamber, for the purpose stated.

3. The piston of a water-meter adapted to have an eccentric or side-rocking movement across the center of the cylinder-chamber and a revolving motion, combined with a registering mechanism by means of a free or shifting connection acting with the continually-changing side-rocking movements of the piston while maintaining a driving relation with the dial mechanism.

4. The combination, with a piston having an eccentric or side-rocking motion across the center of the cylinder-chamber and a revolving motion around its own center to divide the cylinder at two or more bearing-points on its sides, of a valve controlled by the movements of said piston and adapted to open and to close receiving and discharging ports in succession, to effect the purpose stated.

5. A rotary piston having a valve formed therein by opposite end ports or depressions, and adapted to act, in connection with receiving and discharging ports or passages in the cylinder-chamber, to form a valve and piston, into and through which the water entering at the inlet cylinder-end ports passes through one end of the valve into the cylinder on one side thereof, and, re-entering the valve from the other side of said cylinder, passes out at the opposite end ports of said valve, to effect the purpose stated.

6. A rotary valve-piston having opposite end ports $d\ d'$, communicating with the piston sides by diagonal passages $e\ e'$, in combination with a cylinder having receiving and discharging ports, communicating with said opposite valve end ports and with the receiving and discharging spaces of said cylinder, whereby said valve opens some and closes others of its ports in succession, and to effect the equalization of the pressure of the water at right angles to the direction of the side-rocking and rotary movements of the said valve-piston, as stated.

7. The inlet device L, having side walls, a perforated end, and an open-end bearing-rim, seated adjustably in and forming the inlet-port J of the cylinder-chamber, in combination with the rotary piston, against one end of which the said device bears, for the purpose stated.

8. The spaces or recesses $c'$ in the walls of the cylinder, between the bearing-points $b'$ and the recesses $a'$, in combination with the piston having alternate bearing-points and recesses, whereby to prevent the choking of the flow and insure a uniform action of a piston adapted for operation with a side-rocking motion across the center of the cylinder and a rotary motion around its own center.

In testimony that I claim the foregoing I have affixed my signature in the presence of two witnesses.

LEWIS H. NASH.

Witnesses:
A. E. H. JOHNSON,
J. W. HAMILTON JOHNSON.